Aug. 20, 1957   J. H. WILSON   2,803,224
FLUID CYLINDERS
Filed Sept. 3, 1954
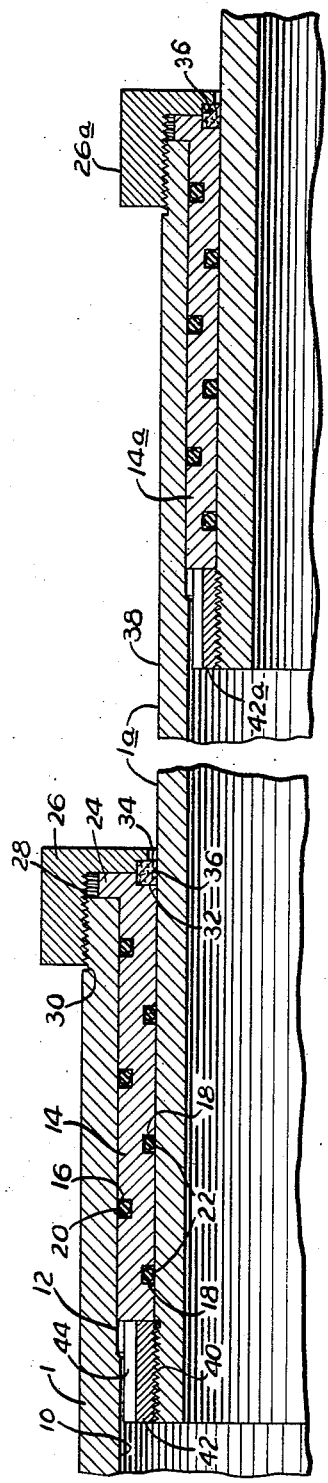
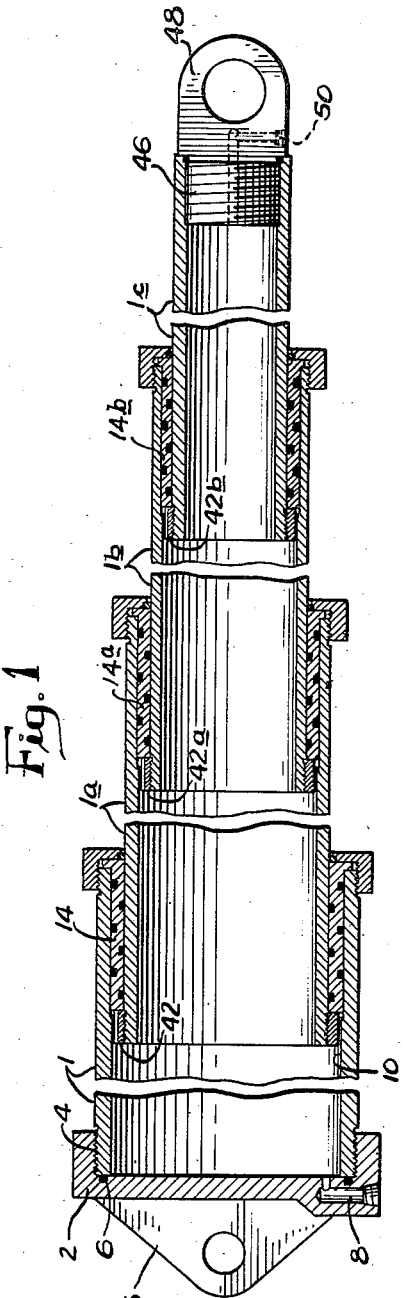
Inventor
John Hart Wilson
By Watson, Cole, Grindle & Watson
attys.

United States Patent Office 2,803,224
Patented Aug. 20, 1957

2,803,224

FLUID CYLINDERS

John Hart Wilson, Wichita Falls, Tex.

Application September 3, 1954, Serial No. 454,081

8 Claims. (Cl. 121—46)

This invention relates to improvements in fluid cylinders, and more particularly to multiple unit hydraulic jacks and similar hydraulic devices of the telescoping type.

Telescoping hydraulic jacks and similar devices comprise, generally, a plurality of hollow cylinders of successively decreasing diameter, slidable one within the other, with packing rings or similar devices interposed between the outer wall of each inner cylinder and the inner wall of the cylinder within which it telescopes. In the case of a jack, of course, the distal ends of the largest and smallest cylinders are provided with means for attachment to the external members which are to be relatively moved by the jack, and in any case means are provided for supplying, to the interior of the cylinder assembly, a fluid under pressure.

The production of telescoping jacks, and similar telescoping hydraulic devices has, in the past, included the operation of machining the interior wall of each cylinder (except the smallest) throughout its entire length, in order to permit the next smaller cylinder to maintain fluidtight engagement therewith in any condition of extension of the jack. This operation is tedious, exacting, time-consuming and expensive. The improvement of the present invention includes the provision of a cylindrical bearing within the outer end of each cylinder (except the smallest) which bearing is sealed to the cylinder in which it is secured, and which bearing is of sufficient longitudinal extent to provide an adequate bearing and guiding surface for the next smaller cylinder. At the same time, it is only necessary to machine the inner wall of each cylinder throughout a relatively small portion of its length, to accommodate the outer surface of the said bearing, thus substantially reducing the cost of the time required in the manufacture of such devices. Also, telescoping jacks and similar devices, constructed according to the invention, may be assembled with increased facility which reduces their cost of production and also the cost of necessary repairs.

Accordingly, it is the general object of the invention to provide a telescoping hydraulic device comprising a plurality of hollow cylinders of successive varying diameters, a cylindrical bearing secured in a fluidtight manner within an end portion of each said cylinder except the smallest, each cylinder except the largest having a machined external surface in close-fitting, sliding engagement with the bearing secured in the next larger cylinder, suitable packing means between each bearing and the cylinder which has sliding engagement therewith, means limiting outward movement of each cylinder with respect to the next larger sylinder, means closing the distal ends of the largest and smallest cylinders, and means for introducing fluid under pressure into one of said cylinders.

A further object is the provision of a device of the character described, in which each cylinder, except the smallest, is finished internally for a portion of its length sufficient to accommodate the said cylindrical bearing secured therein, the remainder of the internal surfaces of the cylinders being unfinished. As used herein the term "unfinished" signifies that the surface so described is not machined to provide a finish which is sufficiently smooth to make pressure-sealing engagement with an adjoining surface.

More specifically, it is an object of the invention to provide, in a device of the character described, cylindrical bearings each having an outwardly projecting annular flange at one end, for abutting engagement with the end of its associated cylinder, and an annular cap member in threaded engagement with the corresponding end of each cylinder, for securing the corresponding bearing flange in tight engagement with the cylinder end.

A further object is the provision, as an article of manufacture, of a sub-assembly of a device of the character described comprising a hollow cylinder finished internally for a portion of its length adjacent one end, a cylindrical bearing of corresponding length in fluidtight engagement with said finished portion, the remainder of the internal surface of the cylinder being unfinished, and detachable means for securing the bearing within the cylinder.

Other and further objects, features and advantages will be apparent from the description which follows, read in connection with the accompanying drawings in which Figure 1 is an axial section through a telescoping hydraulic device constructed according to the invention; and Figure 2 is an enlarged fragmentary axial section of a portion of the device illustrated in Figure 1.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

The device illustrated in Figures 1 and 2 includes a hollow cylinder 1 closed at one end by a cap member 2 having threaded engagement therewith, the threads being indicated at 4. An O-ring seal 6 is provided within the cap 2 for sealing the latter against the adjacent end of the cylinder 1. A threaded inlet passage 8, formed in the cap 2, communicates with the interior of the cylinder.

The interior wall 10 of the cylinder is counter bored as at 12 (Figure 2) for a portion of its length adjacent its outer end (opposite to that closed by the cap 2), and within the counterbore 12 is fitted a bearing ring 14, which is preferably of bronze or other suitable material. The counterbore 12 and bearing 14 need not be of any particular length, but must, of course, be of sufficient length to provide suitable bearing and guiding engagement for the next smaller cylinder, as well as sufficient area for suitable fluidtight sealing against the associated outer cylinder and fluidtight packing against the next inner cylinder. The bearing 14 is provided with external annular grooves 16 and internal annular grooves 18, to receive the O-rings 20 and 22, respectively, in order to provide the aforesaid sealing and packing engagements. An outwardly projecting annular flange 24 at the outer end of bearing member 14 engages the adjacent end of the cylinder 1 and is tightened thereagainst by means of an annular cap 26 having threaded engagement, as at 28, with the adjacent external surface of cylinder 1. Preferably, the outer end of the bearing member 14 and the inner edge of the cap member 26 are chamfered as shown at 32 and 34, respectively, so as to provide, between them, a groove of rectangular section for the reception of a lubricating and wiping member, which is preferably a felt ring 36, which felt ring is in engagement with the external surface of the next smaller cylinder.

The additional cylinders of successively smaller diameter are designated 1a, 1b, etc., and each of them corresponds to cylinder 1, except that they are not closed at their inner ends, and the smallest cylinder 1c is not counterbored at its outer end, but is provided with a closure cap 46 in threaded engagement therewith. The cap 46 may include a fitting 48, for attachment to an external member, and a vapor vent 50.

Each cylinder, except the largest cylinder 1, is provided at its inner end with a retainer ring 42, 42a, etc. threaded thereon as indicated at 40 (Figure 2), each ring 42, 42a, etc. being of slightly smaller external diameter than the internal diameter of the next larger cylinder, and each may be provided with one or more longitudinal grooves 44 of suitable cross-section. The grooves 44 serve to permit the back-flow of any fluid trapped between the retainer ring and the adjacent end of the bearing member 14 during extension of the device, and grooves 44 may also serve as means for engagement with a wrench in assembling the retainer rings onto the respective cylinders.

Assembly of a device constructed according to the invention is accomplished by first threading the respective retainer rings 42, 42a, etc. onto the corresponding cylinders 1a, 1b, etc. inserting cylinder 1a partly into cylinder 1, inserting the bearing member 14 with its O-rings 20 and 22, between cylinders 1 and 1a, applying the annular cap 26 with its O-ring 36, and proceeding in corresponding fashion to assemble the successively smaller cylinders into the device, and applying the end caps 2 and 46, respectively. Disassembly is accomplished in the reverse fashion, and it is thus seen that the device may be readily disassembled for replacing bearing members, O-rings or other parts which become worn and damaged, and is readily re-assembled.

While the invention has been illustrated and described in connection with a multiple cylinder telescoping jack, it will be appreciated that the improvements described herein may be applied to single cylinder telescoping hydraulic devices with equal facility and corresponding advantages.

Having thus described the invention, what is claimed as new and desired to be secured by Letters Patent is:

1. A telescoping hydraulic device comprising a plurality of hollow cylinders of successively varying diameters, a cylindrical bearing secured in a fluidtight manner within the outer end portion of each said cylinder except that of smallest diameter, each cylinder except the largest having a smooth external surface in close fitting sliding engagement with said cylindrical bearing secured in the next larger cylinder, said external surface having an unobstructed substantial clearance from the bore of the next larger cylinder, primary pressure sealing packing means between each said bearing and the cylinders interiorly and exteriorly thereof, respectively, means limiting outward movement of each said cylinder with respect to the next larger cylinder, means closing the distal ends of the largest and smallest cylinders, and means for introducing fluid under pressure into one of said cylinders.

2. The combination defined in claim 1, each said cylinder, except the smallest, being finished internally from its outer end for a portion of its length sufficient to accommodate the cylindrical bearing secured therein, the remainder of the internal surfaces of said cylinders being unfinished, each said bearing being formed internally and externally, respectively, with annular grooves receiving the respective packing means.

3. A telescoping hydraulic device comprising a plurality of hollow cylinders of successively varying diameters, a cylindrical bearing secured in the next larger cylinder, said external surface having an unobstructed substantial clearance from the bore of the next larger cylinder, primary pressure sealing backing means between each said bearing and the cylinder having sliding engagement therewith, means limiting outward movement of each said cylinder with respect to the next larger cylinder, means closing the distal ends of the largest and smallest cylinders, and means for introducing fluid under pressure into one of said cylinders, each said cylindrical bearing having an outwardly projecting annular flange at one end, for abutting engagement with the end of its associated cylinder, and including an annular cap member secured to each said cylinder, except the smallest, and securing the corresponding flange in tight engagement with the said cylinder end.

4. A telescoping hydraulic device comprising a plurality of hollow cylinders of successively varying diameters, each of said cylinders, except the smallest, being finished internally for only a portion of its length adjacent its outer end, the remaining portion of the internal surface of each cylinder being unfinished, a cylindrical bearing, having an out-turned flange, within the finished portion of each of said cylinders, except the smallest, means for securing said bearings in the respective cylinders, each said bearing having internal and external annular grooves formed therein, sealing elements positioned within said respective grooves and in sealing engagement with the interior of the larger and the exterior of the smaller adjacent cylinders and forming a primary pressure fluid seal therebetween, each cylinder, except the largest, having a smooth external surface in close fitting, sliding relation with the respective cylindrical bearings and sealing elements, means limiting the outward movement of each said cylinder with respect to the next largest cylinder, means closing the distal ends of the largest and smallest cylinders, and means of introducing fluid under pressure into one of said cylinders.

5. The device as set forth in claim 4, wherein said sealing elements comprise O-rings fitted within said grooves.

6. A telescoping hydraulic device comprising at least one large, hollow cylinder, said cylinder being finished internally from an end for only a portion of the length thereof, a cylindrical bearing secured in fluidtight manner within said internally finished portion of said hollow cylinder, an externally finished second cylinder extending through said cylindrical bearing and into said first-named hollow cylinder, packing means between said cylindrical bearing and each of said cylinders, means for limiting the outward movement of said second cylinder, means closing the distal ends of the largest and smallest cylinders, means for introducing fluid under pressure into one of said cylinders, said cylindrical bearing having an outwardly projecting, annular flange at one end for abutting engagement with the end of its associated cylinder and including an annular cap member, and means for securing said annular cap member to the adjacent end of said larger cylinder.

7. The combination defined in claim 4, including packing means between the inner edge of each said cap member and the external surface of the next smaller cylinder.

8. As an article of manufacture, a cylinder unit for a telescoping hydraulic jack, comprising a hollow cylinder smoothly finished internally for only a portion of its length from an end thereof, a cylindrical bearing member fitted within said internally finished cylindrical portion, which cylindrical bearing member is of less length than the internally finished portion of said hollow cylinder, which cylindrical bearing member is in primary pressure, fluidtight engagement therewith, the remainder of the internal surface of said cylinder being unfinished, and detachable means for securing said bearing in said engagement.

References Cited in the file of this patent

UNITED STATES PATENTS

| 1,465,365 | Ross | Aug. 21, 1923 |
| 2,308,761 | Komph | Jan. 19, 1943 |
| 2,561,492 | Bronk | July 24, 1951 |
| 2,618,122 | Gratzmuller | Nov. 18, 1952 |
| 2,641,514 | Hecker | June 9, 1953 |